(12) United States Patent
Ikeda

(10) Patent No.: US 7,680,592 B2
(45) Date of Patent: Mar. 16, 2010

(54) SYSTEM AND APPARATUS FOR DRIVE ASSISTANCE

(75) Inventor: Hirotane Ikeda, Nagoya (JP)

(73) Assignee: DENSO Corporation, Kariya (JP)

( * ) Notice: Subject to any disclaimer, the term of this patent is extended or adjusted under 35 U.S.C. 154(b) by 597 days.

(21) Appl. No.: 11/714,522

(22) Filed: Mar. 6, 2007

(65) Prior Publication Data
US 2007/0219709 A1    Sep. 20, 2007

(30) Foreign Application Priority Data
Mar. 14, 2006    (JP) .............................. 2006-069175

(51) Int. Cl.
*G01C 21/00*    (2006.01)
*H04N 7/18*    (2006.01)
*G06F 19/00*    (2006.01)

(52) U.S. Cl. ........................ 701/207; 701/211; 382/103; 348/149

(58) Field of Classification Search ................ 701/207, 701/211, 210, 208; 382/103; 348/149; 340/439, 340/938
See application file for complete search history.

(56) References Cited

U.S. PATENT DOCUMENTS

2004/0178894 A1 *   9/2004   Janssen ....................... 340/435
2005/0007244 A1     1/2005   Lang et al.
2005/0174257 A1 *   8/2005   Shankwitz et al. .......... 340/909

FOREIGN PATENT DOCUMENTS

| DE | 201 06 977     | 10/2002 |
|----|----------------|---------|
| DE | 10 2004 035856 | 3/2005  |
| JP | 04-184481      | 7/1992  |
| JP | 07-117593      | 5/1995  |
| JP | 2000-259818    | 9/2000  |
| JP | 2001-018717    | 1/2001  |
| JP | 2001-357498    | 12/2001 |
| JP | 2004-249836    | 9/2004  |
| JP | 2005-011252    | 1/2005  |
| JP | 2006-224700    | 8/2006  |

OTHER PUBLICATIONS

Office action dated Aug. 6, 2009 in corresponding German Application No. 10 2007 011122.5.
Office action dated Sep. 15, 2009 in corresponding Japanese Application No. 2006-069175.

* cited by examiner

*Primary Examiner*—Tan Q. Nguyen
(74) *Attorney, Agent, or Firm*—Harness, Dickey & Pierce, PLC

(57) ABSTRACT

A drive assistance system is provided for assisting an operation of a driver of a vehicle in a manner that does not cause disturbance for the driver, based on image information derived from an external apparatus such as roadside cameras or the like. The image information is provided for the driver by a liquid crystal display unit, and the provision of the image information is accompanied by a provision of supplemental information from a headup display unit that draws driver's attention to the provision of the image information from the liquid crystal display unit in an appropriate manner.

18 Claims, 10 Drawing Sheets

SYSTEM AND APPARATUS FOR DRIVE ASSISTANCE

CROSS REFERENCE TO RELATED APPLICATION

This application is based on and claims the benefit of priority of Japanese Patent Application No. 2006-69175 filed on Mar. 14, 2006, the disclosure of which is incorporated herein by reference.

FIELD OF THE INVENTION

The present invention generally relates to a drive assistance system for use in a vehicle.

BACKGROUND INFORMATION

A vehicular information system disclosed in Japanese patent document JP-A-2001-357498 uses a technique that changes an information provision style for a driver of a vehicle depending on a condition whether a driver's gazing point detected by a gaze detector falls in a predetermined area that defines a driver's view around an obstacle in front of the vehicle when a location of the obstacle relative to the vehicle is detected by an obstacle detector.

The technique in the above disclosure uses a liquid crystal display device disposed on an instrument panel and a headup display device that displays an image on a lower portion of a windshield. However, when information is displayed on the liquid crystal display for the driver, the position of the liquid crystal display far out of the driver's view makes it difficult for the driver to quickly recognize the provision of the information when the driver is involved in a driving operation. That is, the information on the liquid crystal display may be prone to be overlooked by the driver.

On the other hand, though the headup display is positioned in the driver's view, the driver's attention may be distracted from the driving operation when the image in the headup display contains a complicated form of information. That is, the information in the headup display may be served in an inappropriate manner for the driver due to the form of the information provided therein. Therefore, the technique in the above disclosure copes with the above-described problems by employing an operation scheme that provides obstacle information for the driver based on an assumption that provision of the obstacle information is required for the driver when the detected obstacle is not within the driver's view that is defined as a predetermined area around the driver's gazing point.

However, the information about an obstacle in a dead angle of the driver cannot be provided for the driver by the vehicle information system that employs the above-described operation scheme because the obstacle is not in the driver's view for all the time. In other words, the information about the obstacle in the dead angle of the driver cannot be provided for the driver in a manner that does not distract driver's attention inappropriately or a manner that does not tend to be overlooked.

SUMMARY OF THE INVENTION

In view of the above and other problems, the present invention provides a drive assistance system and apparatus that provides information for a driver in a manner that does not cause disturbance in the course of information provision for the driver for assisting driving operation in terms of improvement of drivability of a vehicle.

In one aspect of the present disclosure, the drive assistance system for assisting an operation of a driver includes, an information transmission unit for transmitting field information representative of an outer field of the vehicle, a set of information provision units for providing the field information for the driver, and a control unit for controlling the set of information provision units. The information transmission unit is disposed on an outside of the vehicle, and the outer field of the vehicle includes a field that is potentially invisible from the driver in an outside of the vehicle. Further, the control unit makes one of the information provision units provide the field information derived from the information transmission unit for the driver for assisting the operation of the driver, and the control unit makes one other information provision unit provide supplemental information that identifies the information provision unit being controlled for providing the field information derived from the information transmission unit. Furthermore, the information transmission unit, the set of information provision units and the control unit are organized as a drive assistance apparatus. When the information for assisting the operation of the driver is provided in this manner, the driver of the vehicle is required to watch the information provision unit that displays the field information only when the supplemental information is displayed in the view of the driver in a simple form that does not distracts the driver's attention inappropriately.

In another aspect of the present disclosure, the drive assistance system provides the field information from a liquid crystal display and the supplemental information from a headup display or from a speaker. In this manner, the field information and the supplemental information are provided for the driver in a suitable manner.

In yet another aspect of the present disclosure, the drive assistance system provides the field information from plural liquid crystal displays, thereby enabling the provision of the field information to be in an intuitive manner or in an efficient manner.

In still yet another aspect of the present disclosure, the drive assistance system terminates the provision of the field information as soon as the driver's recognition of the information is detected. In this manner, unnecessary provision of the information that may cause disturbance is prevented. Further, the driver's recognition of the information is detected by a detector, thereby enabling a secure detection of the driver's recognition.

In still yet another aspect of the present disclosure, the drive assistance system vocally or mechanically receives an input from the driver to detect the driver's recognition of the information, thereby enabling a secure detection of the driver's recognition.

In still yet another aspect of the present disclosure, the drive assistance system prevents an excessive reliance of the driver on the assistance system by warning the driver when the an over-reliance of the drive on the assistance system is detected. In this manner, the drive assistance system appropriately serves as a suitable assistance mechanism for assisting the driver's operation.

In still yet another aspect of the present disclosure, the drive assistance system provides the information and/or the warning for the driver when an obstacle or the like is in a dead angle of the driver, or when the obstacle may come into the dead angle in a certain situation such as traveling a merge lane of an expressway or the like. In this manner, the drive assistance system serves as a suitable drive assistance mechanism for the driver of the vehicle. Further, the drive assistance system uses various criteria for defining the situation that appropriately serves for the driver in terms of the assistance of the driver's operation. The criteria include an area in and around an intersection or the like.

BRIEF DESCRIPTION OF THE DRAWINGS

Other objects, features and advantages of the present invention will become more apparent from the following detailed description made with reference to the accompanying drawings, in which.

DETAILED DESCRIPTION

Preferred embodiments of the present invention is described with reference to the accompanying the drawings. In the following description, the situations are assumed to be an example of the left-side traffic. However, the present invention can be applicable to the right-side traffic when the right and the left in the description is reversed.

First Embodiment

Figure 1:
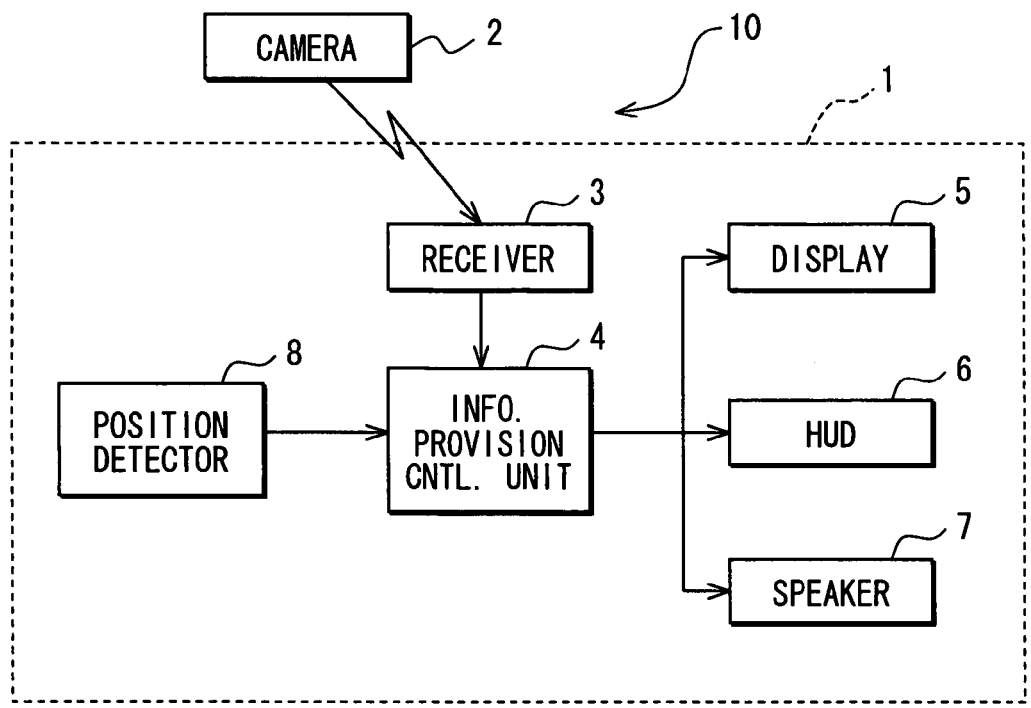
FIG. 1 shows a block diagram of a drive assistance system in a first embodiment of the present disclosure.

A first embodiment of the present invention is described with reference to FIGS. 1 to 6. FIG. 1 shows a block diagram of a drive assistance system in the first embodiment. A drive assistance apparatus 1 is disposed on a vehicle, and receives image information captured and transmitted wirelessly from a camera 2 on a roadside (e.g., at an intersection) by a receiver 3 in a form of a radio signal. The communication between the drive assistance apparatus 1 and the camera 2 is established as, for example, a dedicated short range communication (DSRC).

Figure 2:
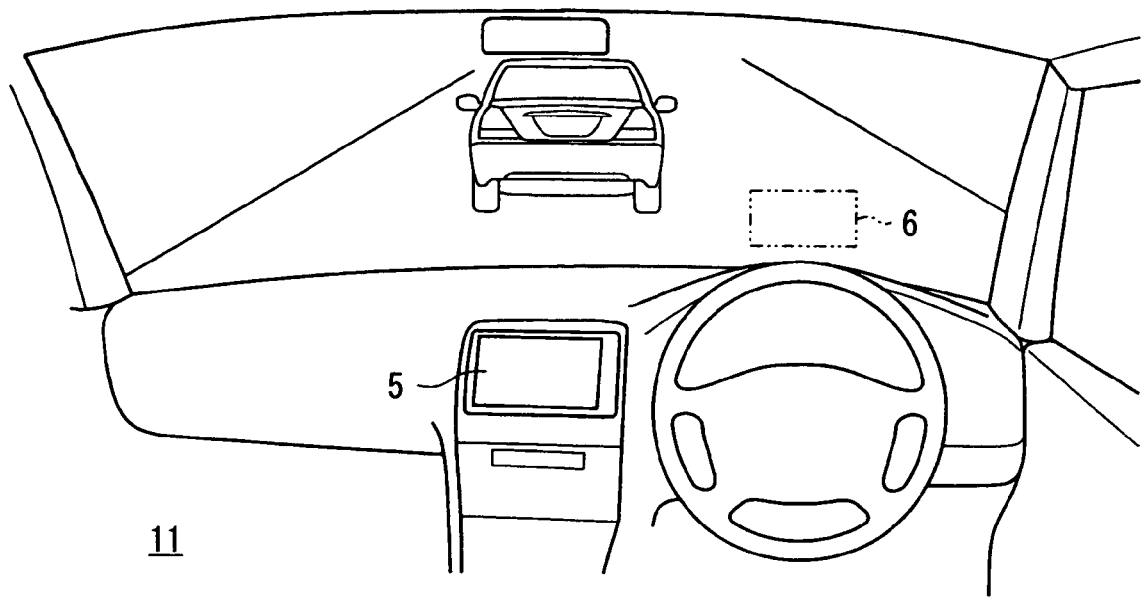
FIG. 2 shows an illustration of a front view of a vehicle through a windshield.

The radio signal of the image information received by the receiver 3 is demodulated and outputted to an information provision control unit 4. The information provision control unit 4 controls a liquid crystal display unit 5, a headup display unit (HUD) 6 for information display, and also controls voice signal output from a speaker 7. In this case, as shown in FIG. 2, the HUD 6 displays an image in an area (shown in a two-dot dash line) in front of a driver of a vehicle. The liquid crystal display unit 5 may be a display unit of, for example, a car navigation system (not shown in the figure), and is disposed at a center of an instrument panel in the vehicle.

The information provision control unit 4 receives a vehicle position information from a position detector 8. The position detector 8 is, for example, a part of the car navigation system in communication with a well-known type of GPS receiver and the like. A drive assistance system 10 of the present invention includes the drive assistance apparatus 1 and the camera 2.

The operation of the drive assistance system 10 is explained with reference to FIGS. 3 to 6. FIG. 4 shows a top view illustration of an intersection for an explanation of the operation of the drive assistance system 10. A subject vehicle 11 is waiting in an intersection to turn to the right, and an oncoming vehicle 12 stopping in front of the subject vehicle 11 for a right turn is obstructing a view from the subject vehicle 11. That is, the driver of the subject vehicle 11 can not directly see an oncoming vehicle 13 that is going to pass through the intersection because the vehicle 13 is behind the vehicle 12. In other words, the vehicle 13 is in a dead angle of the driver of the vehicle 11. In this case, the camera 2 is disposed at the lower right corner in FIG. 2, and looks down on the intersection in a overlooking manner.

An area A, an area B, and an area C in FIG. 4 are areas where the image information from the camera 2 can be received. For example, the area B is defined as a road segment of 30 meters from the intersection and an inside area of the intersection. The area A is a road segment adjacent to the area B having a length of 100 meters from the segment in the area B. The area C is a road segment adjacent to the area B, and is defined as a segment that is traveled by the vehicle after turning right at the intersection.

Figure 3:
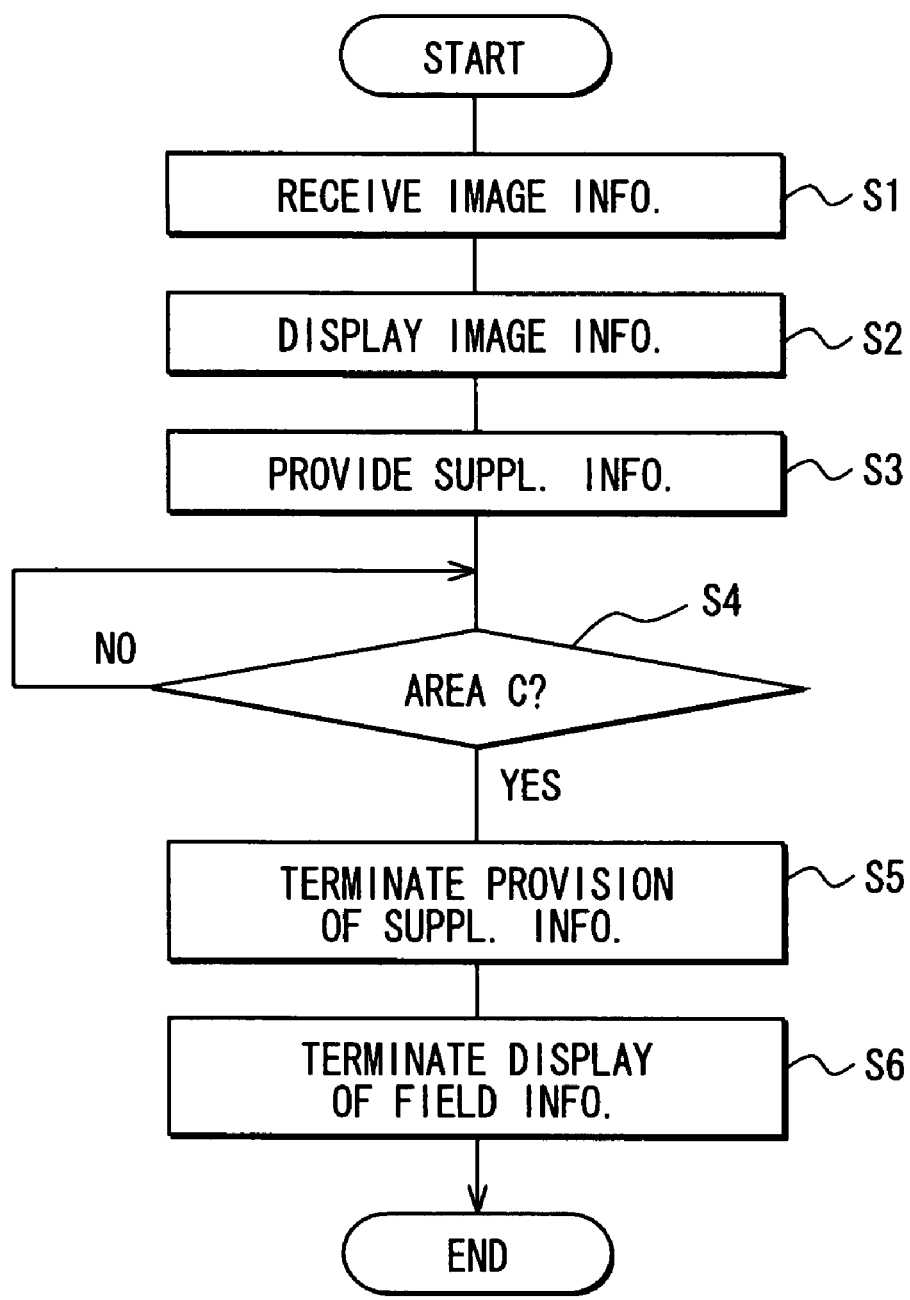
FIG. 3 shows a flowchart of a process for providing information when the vehicle enters into a predetermined area.
Figure 4:
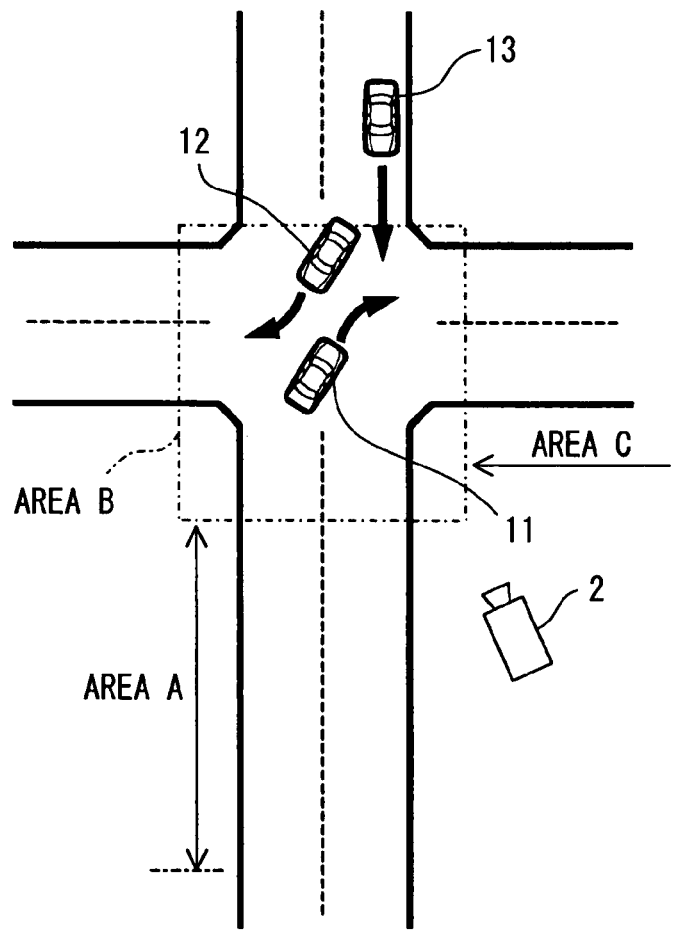
FIG. 4 shows an illustration of an intersection for an explanation of an operation of the drive assistance system.
Figure 5:
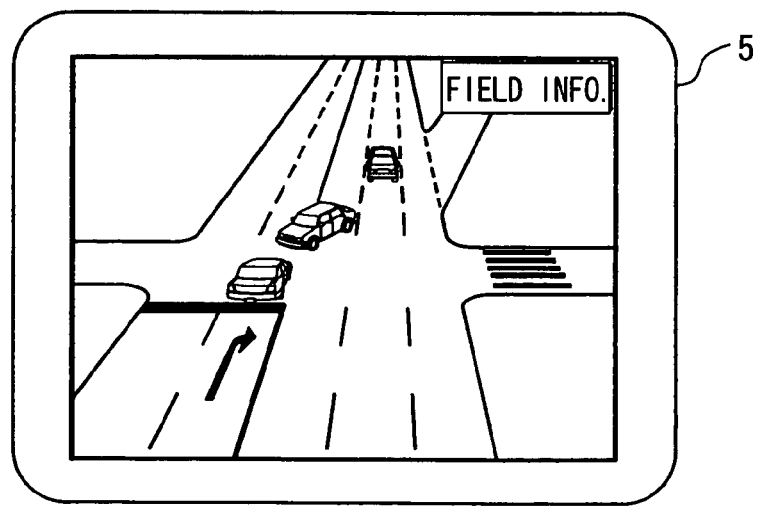
FIG. 5 shows an illustration of an image of a liquid crystal display unit.

FIG. 3 shows a flowchart of a process for providing information by the information provision control unit 4 and other units when the subject vehicle 11 enters into the area A. The information provision control unit 4 receives the image information of the intersection from the camera 2 in step S1, and displays the information on the liquid crystal display unit 5 in step S2. FIG. 5 shows an illustration of an image displayed on a display screen of the liquid crystal display unit 5.

Figure 6:
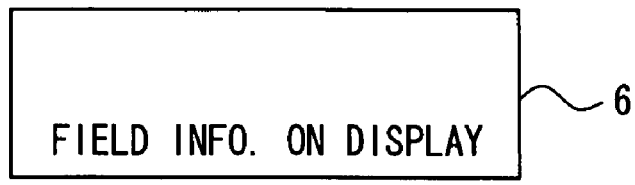
FIG. 6 shows an illustration of an image of a headup display apparatus.

Then, the HUD 6 displays, as shown in FIG. 6, a text message of "Field information on display" as supplemental information in a view of the driver for drawing a driver's attention that the dead angle image is displayed on the liquid crystal display unit 5 for assisting the driver's operation. At the same time, the speaker 7 provides, for example, a voice message such as "Field information is on display," a warning sound or the like as the supplemental information is step S3. In this manner, the subject vehicle 11 can recognize that the image information for assisting the driver's operation is displayed on the liquid crystal display unit 5 disposed at the center of the instrument panel while watching in a front field of the vehicle. The output of the voice message, the warning sound or the like may be just once, or may be repeated at a predetermined interval while the information is displayed on the display unit 5.

The information provision control unit 4 determines whether the subject vehicle 11 has entered the area C after passing through the areas A and B based on the vehicle position derived from the position detector 8 in step S4. The process for providing the information continues to display the field information when the subject vehicle 11 has not entered the area C (step S4:NO). The process proceeds to step S5 for terminating the output of the message from the HUD 6 and the speaker 7 when the subject vehicle 11 has entered the area C (step S4:YES). Then, the process proceeds to step S6 for terminating the display of the field information on the liquid crystal display unit 5.

The drive assistance apparatus 1 in the subject vehicle 11 in the first embodiment displays the field information that includes a dead angle of the driver's view on the liquid crystal display unit 5 under control of the information provision control unit 4 when the apparatus 1 receives the image information from the camera on a roadside. Then, the provision of the image information is provided as the supplemental information for the driver from the HUD 6 as the text message, and is provided from the speaker 7 as the voice message of "Field information is displayed" or the like.

Therefore, because the driver of the subject vehicle 11 looks at the liquid crystal display 6 that provides the field information only when the supplemental information to notify the provision of the field information is provided for the driver from the HUD 6 or the speaker 7, the driver can securely recognize the provided field information. In addition, a limited amount of the supplemental information provided for the driver can prevent inconvenience of the driver caused by the provision of the supplemental information, thereby improving condition of the driving operation without harm effect.

Further, the liquid crystal display unit 5 on the instrument panel is suitable for providing drive assistance information such as the field information that contains a large amount of information, and the HDU 6 and the speaker 7 are suitable for providing the supplemental information that contains a small amount of information as a text, a sound or the like.

Second Embodiment

A second embodiment is described with reference to FIGS. 7 to 11. Like parts have like numbers in the description and the focus of the description is put of the difference between the embodiments.

Figure 7:
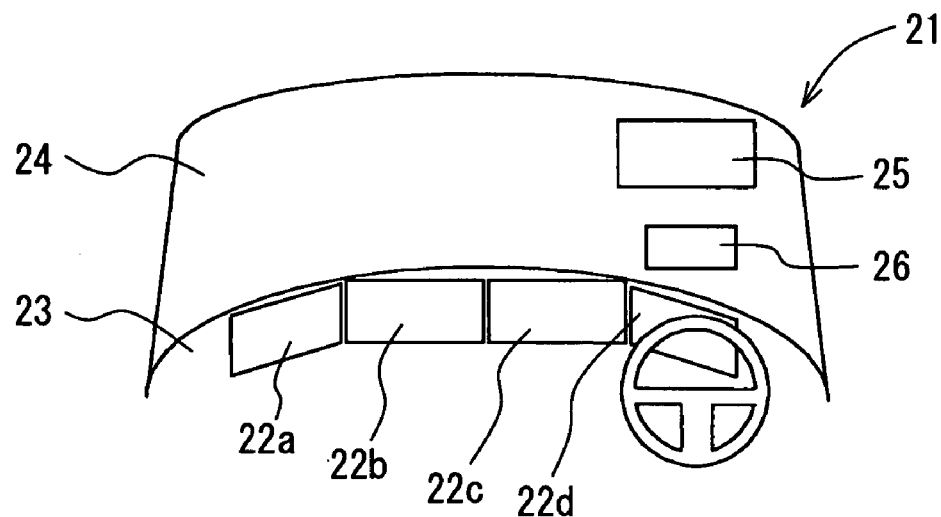
FIG. 7 shows a block diagram of the drive assistance system in a second embodiment.
Figure 8:
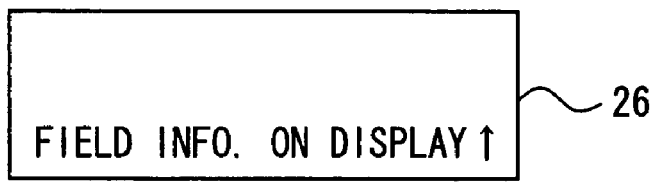
FIG. 8 shows an illustration of an image of a headup display apparatus in the second embodiment.
Figure 9:
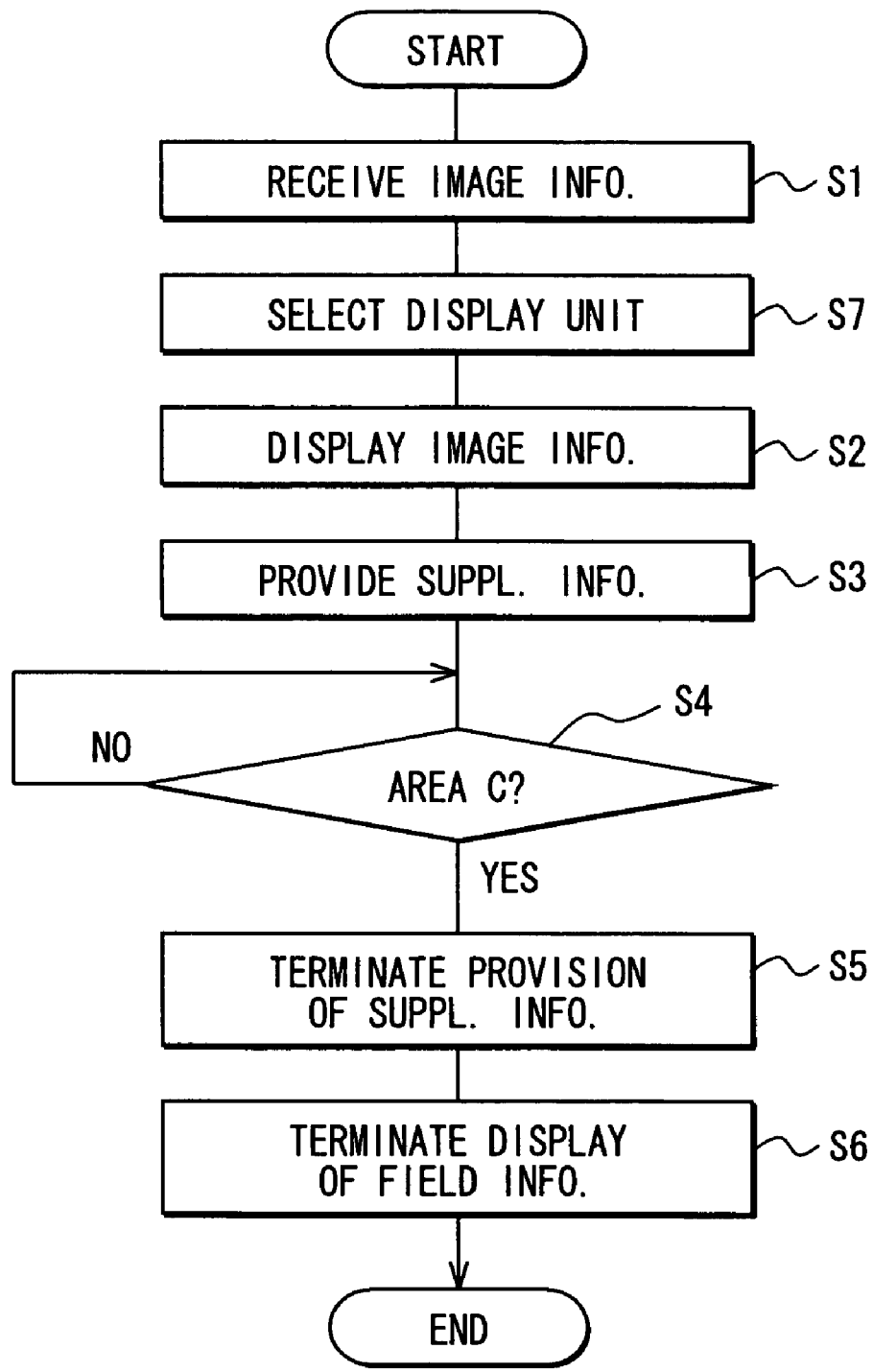
FIG. 9 shows a flowchart of a process for providing information when the vehicle enters into a predetermined area in the second embodiment.

A drive assistance apparatus 21 in the second embodiment includes, as shown in FIG. 7, four pieces of the liquid crystal display unit 22a to 22d on an instrument panel 23. In addition, a windshield 24 includes a windshield display (WSD) 25 and a HUD 26 in a vertically arranged manner. Further, the information provision control unit 4 determines whether the field information is displayed on the liquid crystal display unit 22 and/or the display 25 based on a view point information included in the image information derived from the camera 2 on the roadside or the like.

Figure 10:
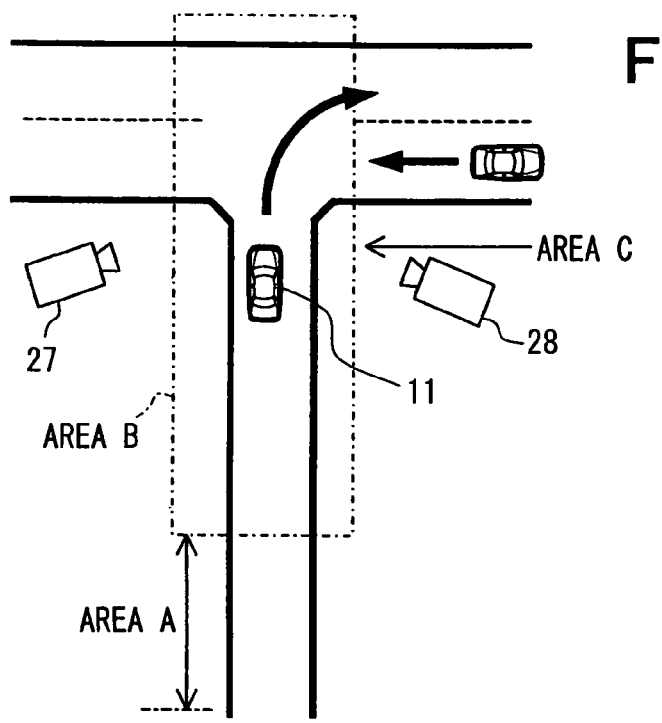
FIG. 10 shows an illustration of an intersection for an explanation of an operation of the drive assistance system in the second embodiment.
Figure 11:
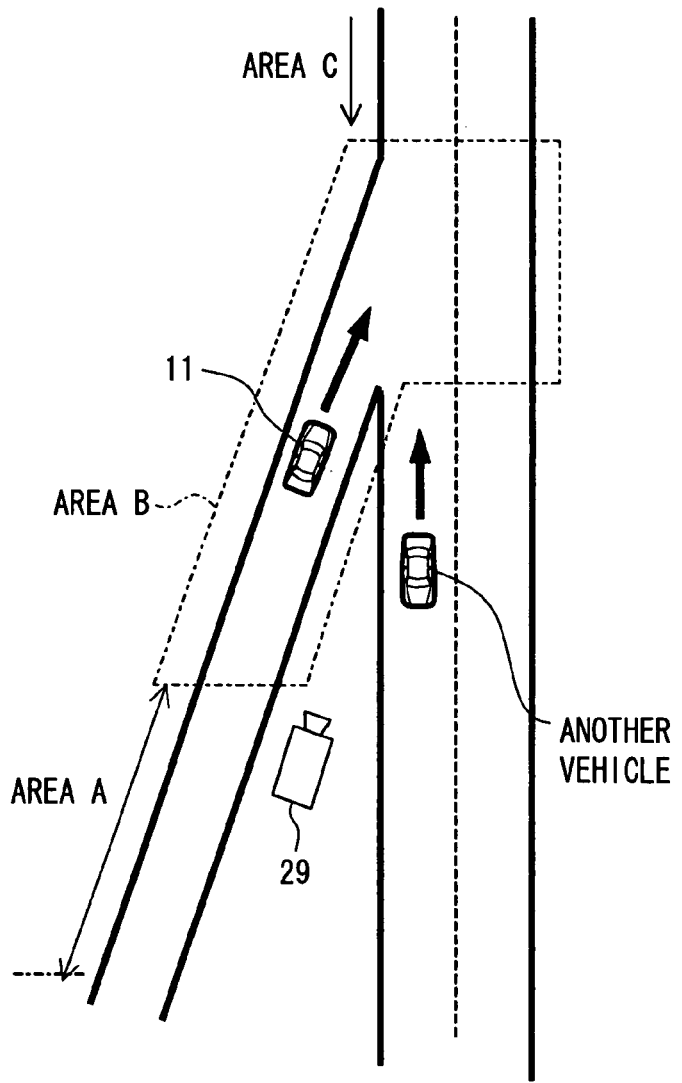
FIG. 11 shows another illustration of an intersection for an explanation of an operation of the drive assistance system in the second embodiment.

A situation of the traffic is described in illustrations in FIGS. 10 and 11 with a definition of the areas A, B, and C. FIG. 10 shows a situation that the subject vehicle 11 enters into a so-called "blind corner" in a T shape, and another vehicle coming into the intersection from a right side is running in the dead angle. In this case, the intersection has the dead angle because of a building on a lower right corner of the intersection in FIG. 10. Further, the area B is defined as an inside of the intersection and the road segment of 50 meters before the intersection. Cameras 27, 28 are respectively disposed on a lower left corner and a lower right corner of the T shape intersection in the figure, and captures the image of the vehicle that enters into the intersection from right and left.

FIG. 11 shows a situation that the subject vehicle 11 is on a merge lane of, for example, an expressway, and another vehicle on a main lane is coming from behind (i.e., in the dead angle) of the subject vehicle 11 in a course of acceleration for merging. In this case, the area B is an inside and a segment of 100 meters from a merge point. A camera 29 is disposed to capture the image of the area B, that is, an entire coverage of the area B.

The image information from cameras 2, 27-29 in FIGS. 4, 10, 11 has different angles, thereby including view point information that specifies viewing angle of the respective cameras 2, 27-29. The information provision control unit 4 in the drive assistance apparatus 1 determines a device that displays the image information based on the view point information included in the image information.

The operation of the drive assistance system 10 in the second embodiment is explained with reference to the figure. The information provision control unit 4 performs the process shown as a flowchart in FIG. 9. The process in FIG. 9 corresponds to the process of the first embodiment shown in FIG. 3. The information provision control unit 4 receives the image information in step S1, and selects a display unit for displaying the field information for assisting the driver's operation based on the view point information in step S7. Then, the field information is displayed on the selected display unit in step S2. The rest of the process is performed in the same manner as the first embodiment.

For example, the subject vehicle 11 in FIG. 4 is turning right at the intersection, and the field information is displayed on the WSD 25 based on the view point information. In this manner, an image of the oncoming vehicle that is entering the intersection from a front direction is displayed on the WSD 25 in an illustrative manner. The supplemental information of, for example, "Field information on display" or the like is simultaneously displayed on the HUD 26 for drawing driver's attention in step S3.

In the situation of the illustration in FIG. 10, the subject vehicle 11 is entering into the T shape intersection, and the images from the camera 27 and 28 are respectively displayed on the liquid crystal display units 22a and 22d. Therefore, the image of the vehicles that are entering the intersection appear on the display units 22a, 22d that are positioned in a corresponding manner on the instrument panel.

In the situation of the illustration in FIG. 11, the subject vehicle 11 is approaching to the merge point, and the image from the camera 29 is displayed on the display unit 22d. Therefore, the image of the vehicle coming from a rear right direction is displayed on the display unit 22d that is positioned in a corresponding manner on the instrument panel.

The liquid crystal display unit 22 and the displays 25, 26 are not only used for displaying the field information for assisting the driver's operation, but also used for a route navigation toward a destination when, for example, the car navigation system is installed on the vehicle. Therefore, the display condition of those display units may be changed in a suitable manner according to the running condition of the subject vehicle 11.

For example, in the situation in FIG. 4, the field information may be displayed on the display unit 22c when the route navigation is already displayed on the WSD 25. Also, when the liquid crystal display unit 22a is used for displaying the image from a on-vehicle camera that captures an image of a real left direction of the subject vehicle 11 in the situation in FIG. 10, the image from the camera 27 may be displayed on the liquid crystal display unit 22b.

Further, when the route navigation is displayed on the WSD 25 on the subject vehicle 11 in the area A as shown in the situation in FIG. 4, the field information for driver's assistance may be displayed on the liquid crystal display unit 22d. Then, when the subject vehicle 11 has entered into the area B, the image on the WSD 25 and the image in the display unit 22d are swapped. That is, the display condition of the assistance information is dynamically changed according to a priority of the information.

The information for assisting driver's operation in the second embodiment is selectively displayed on the plural liquid crystal display units 22 and on the WSD 25 in an intuitive manner and/or in an effective manner.

Third Embodiment

Figure 12:
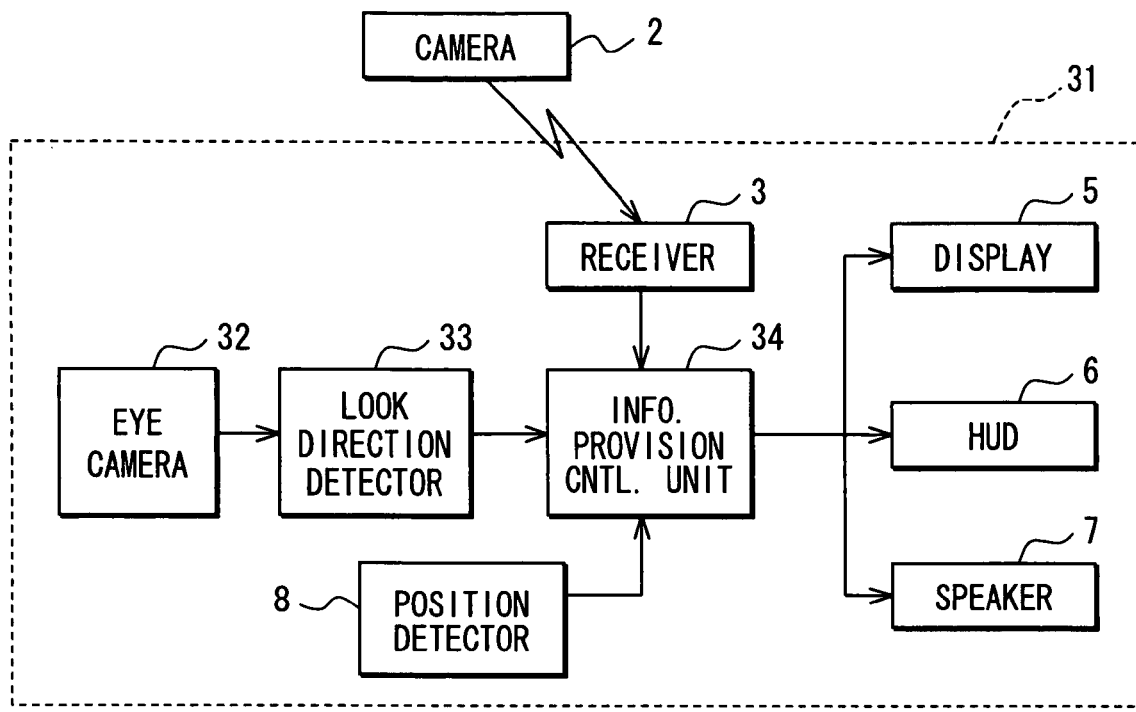
FIG. 12 shows a block diagram of the drive assistance system in a third embodiment.

A third embodiment is described with reference to FIGS. 12 to 14. The drive assistance apparatus 31 in the third embodiment includes, as shown in FIG. 12, an eye camera 32 for capturing an image of a driver's face including a pupil of an eye, and a look direction detector 33 that detects a driver's look direction based on a processing of the image captured by the camera 32.

Figure 13:
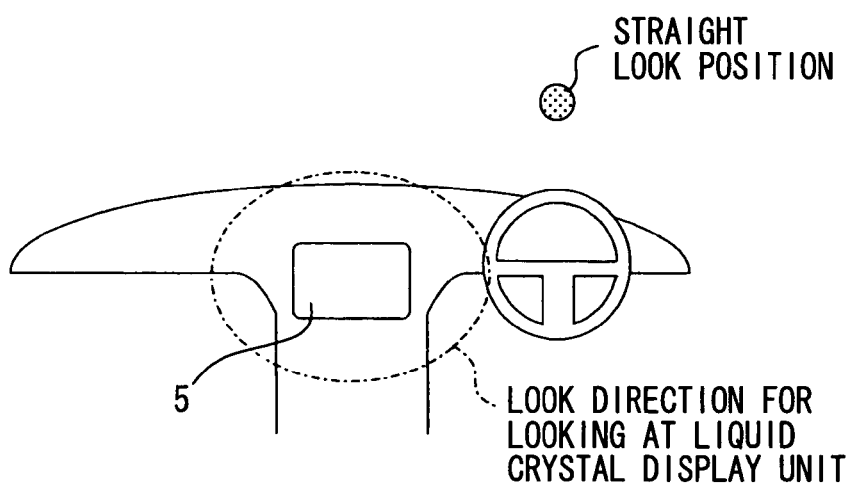
FIG. 13 shows an illustration of the front view of the vehicle through the windshield in the third embodiment.
Figure 14:
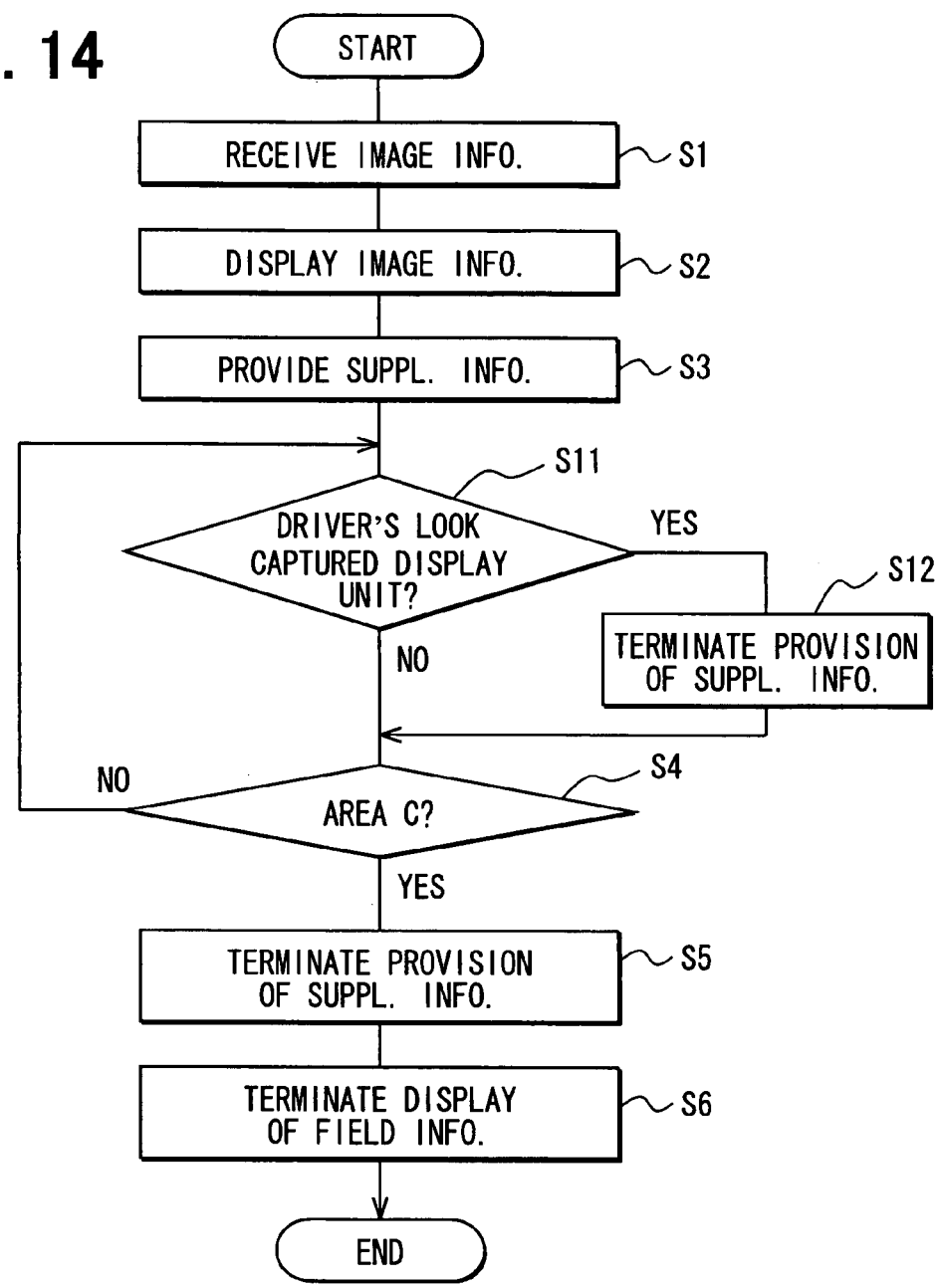
FIG. 14 shows a flowchart of a process for providing information when the vehicle enters into a predetermined area in the third embodiment.

The look direction detection 33 detects, as illustrated in FIG. 13, a current look direction of the driver based on a straight look position of the driver, and outputs the current look direction to the information provision control unit 34. The information provision control unit 34 stores a look direction for looking at the liquid crystal display unit 5 on the instrument panel based on a geometrical relationship between the driver and the liquid crystal display 5. The information provision control unit 34 determines whether the driver is looking at the liquid crystal display unit 5 based on the driver's look direction detected by the look direction detector 33.

The look direction for looking at the liquid crystal display unit 5 is, for example, the driver's look direction in a leftward angle of 20 to 50 degrees from the straight look position, and in a downward angle of 20 to 50 degrees from the straight look position for a right side steering vehicle. The vehicle for the right side traffic may have a rightward angle instead of the leftward angle for the definition of the look direction.

The operation of the drive assistance system 10 in the third embodiment is described with reference to a flowchart in FIG. 14. The information provision control unit 34 executes step S1 to S3 in the same manner as steps S1 to S3 in the first embodiment as shown in FIG. 3. Then, in step S11, the look direction detector 33 determines whether the driver's look captured the liquid crystal display unit 5. When the driver's look direction does not capture the liquid crystal display unit 5 (step S11:NO), the process proceeds to step S4, and continues to display the image information as in steps S2, S3 until the subject vehicle 11 enters into the area C. When the driver's look has captured the liquid crystal display unit 5 (step S11: YES), the process proceeds to step S12 to terminate provision of the supplemental information by the HUD 6, before proceeding to step S4. The rest of the process is executed in the same manner as the first embodiment.

The information provision control unit 34 in the third embodiment terminates the provision of the supplemental information from the HUD 6 when the driver's look has captured the liquid crystal display unit 5 based on the driver's look direction detected by the look direction detector 33. In this manner, the supplemental information is prevented from being displayed uselessly, and the recognition of the field information by the driver is securely determined based on the driver's look direction.

Further, the information provision control unit 34 determines the recognition of the liquid crystal display unit 5 by the driver in the right and left side steering vehicle in an above-described manner, thereby serving the driver in an appropriate manner.

Fourth Embodiment

Figure 15:
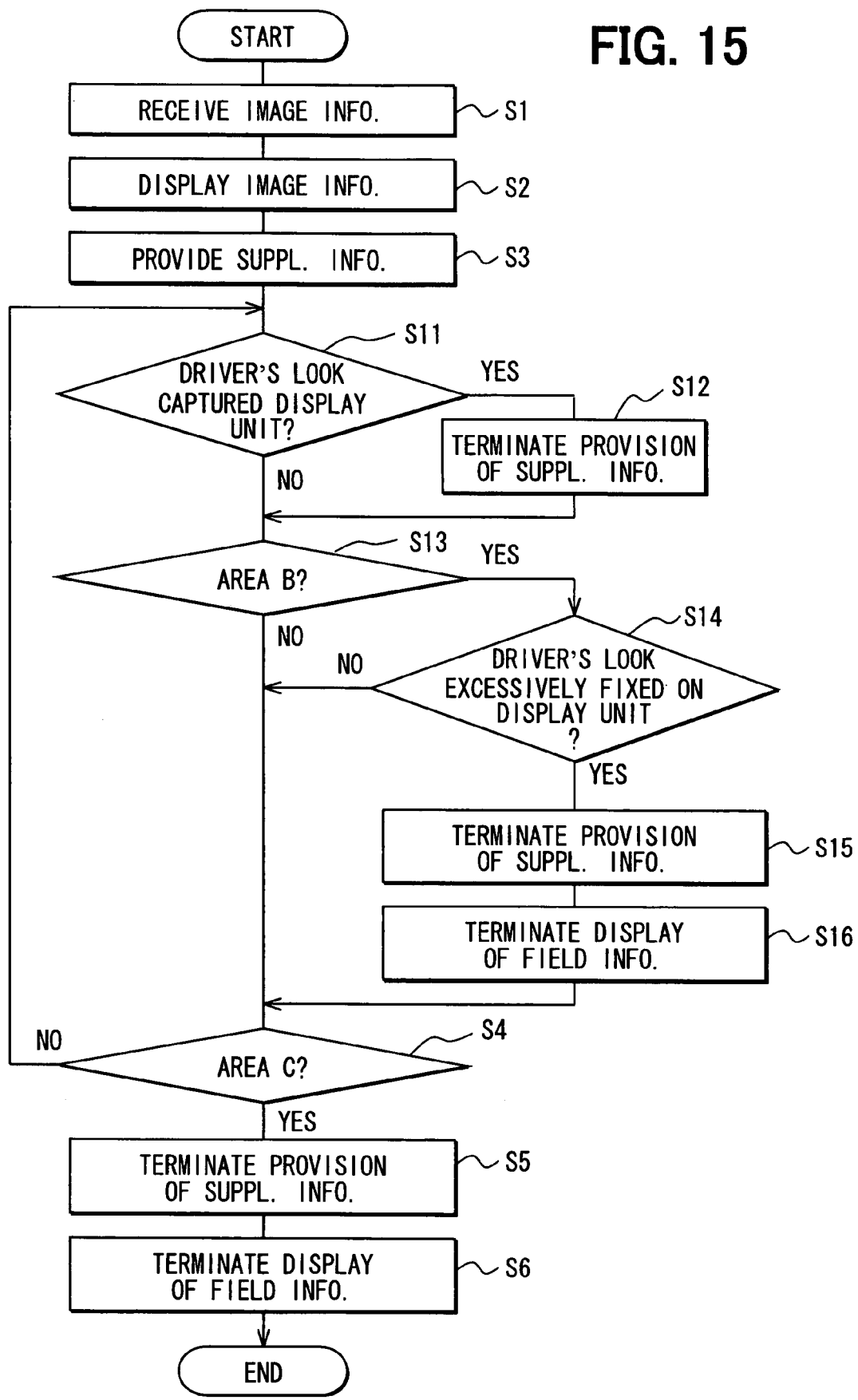
FIG. 15 shows a flowchart of a process for providing information when the vehicle enters into a predetermined area in a fourth embodiment.

A fourth embodiment is described with reference to FIGS. 15 to 16. The difference between the third embodiment and the fourth embodiment exists in a process executed in the information provision control unit 34. The difference is explained with reference to the situation in the first embodiment shown in FIG. 4. In step S11 in the fourth embodiment, the process proceeds to step S13 for determining whether the subject vehicle 11 is in the area B after a negative determination in step S11 (step S11:NO), or after step S12. The process proceeds to step S4 when the subject vehicle 11 is not in the area B (step S13:NO).

When the subject vehicle 11 is in the area B (step S13: YES), the information provision control unit 34 determines whether the driver is looking at the liquid crystal display unit 5 in an excessive manner in step S14.

When the driver's look direction fixed on the liquid crystal display unit 5 for, for example, more than one second, the driver's look direction is determined to be excessively fixed on the liquid crystal display unit 5 by the information provision control unit 34. The process proceeds to steps S15 and S16 that are equivalent to steps S5 and S6 in FIG. 3 when the process determines affirmatively in step S14 (step S14:YES) before proceeding step S4. The process proceed to step S4 without going through steps S15 and S16 when the process determines negatively in step S14 (step S14:NO).

Figure 16:
FIG. 16 shows an illustration of an image of a liquid crystal display apparatus in the fourth embodiment.

The execution of steps S15 and S16 may be substituted with a warning message of "Warning! Directly watch traffic condition with your own eyes" or the like as shown in FIG. 16. The content of the warning may be vocally outputted from the speaker 7. The blind corner situation in FIG. 10 and the merging situation in FIG. 11 may be handled in the same manner when the area B in step S13 is appropriately defined. That is, when the driver's look is determined to be fixed on the liquid crystal display unit 5 in those situations, the warning is preferably provided.

The information provision control unit 34 in the fourth embodiment is used in the situations in FIGS. 4, 10, 11 for appropriately providing the warning for the driver in the area B that is suitably adjusted for the respective situations. Further, the warning message is suitably provided for the driver from the liquid crystal display unit 5 or from the speaker as the text message and the vocal message, thereby appropriately drawing driver's attention for encouraging the driver to have a direct view of the traffic condition.

Fifth and Sixth Embodiments

Figure 17:
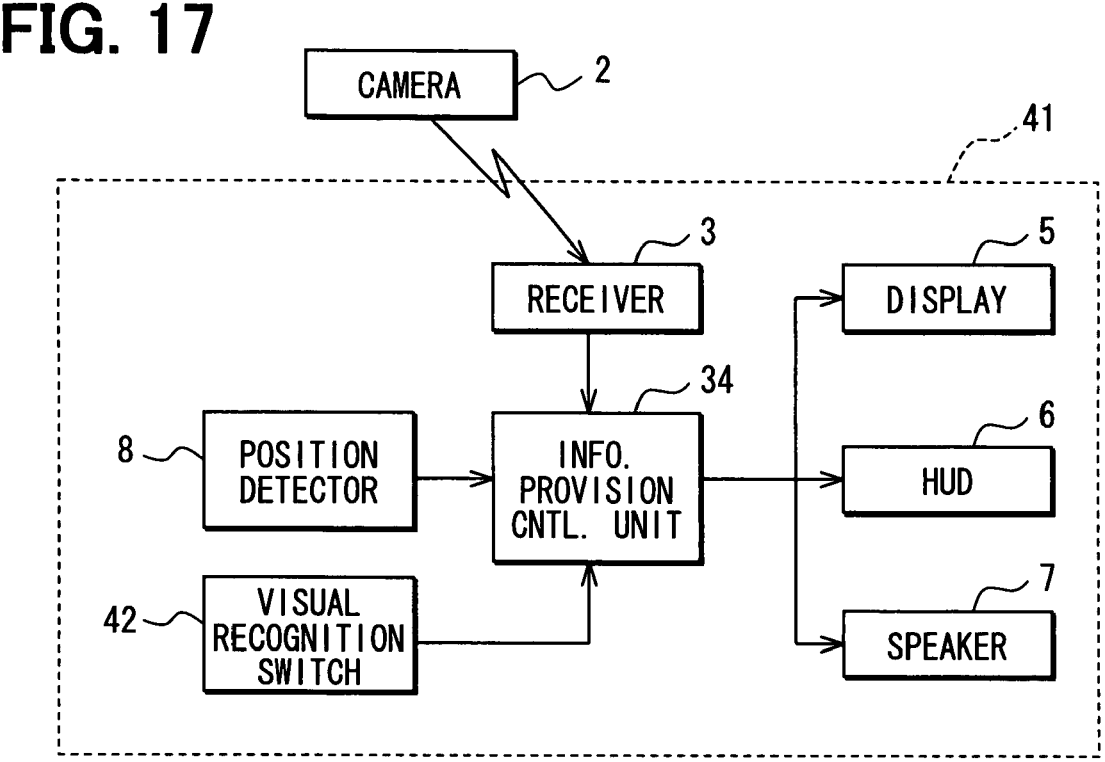
FIG. 17 shows a block diagram of the drive assistance system in a fifth embodiment.

A fifth and sixth embodiments are described with reference to drawings in FIGS. 17 and 18. FIG. 17 shows a block diagram of the drive assistance apparatus 41 in the fifth embodiment includes a visual recognition switch 42 added to the apparatus 31, with omissions of the eye camera 32 and the look direction detector 33 from the apparatus 31 in the third embodiment. The visual recognition switch 42 is provided as a push switch or the like on, for example, on a steering wheel. The switch 42 is operated by the driver when the driver recognized the field information for assisting the driver's operation on the liquid crystal display unit 5. The information provision control unit 34 determines affirmatively upon having an input from the switch 42 in step S11 in FIG. 14 (step S11:YES).

Figure 18:
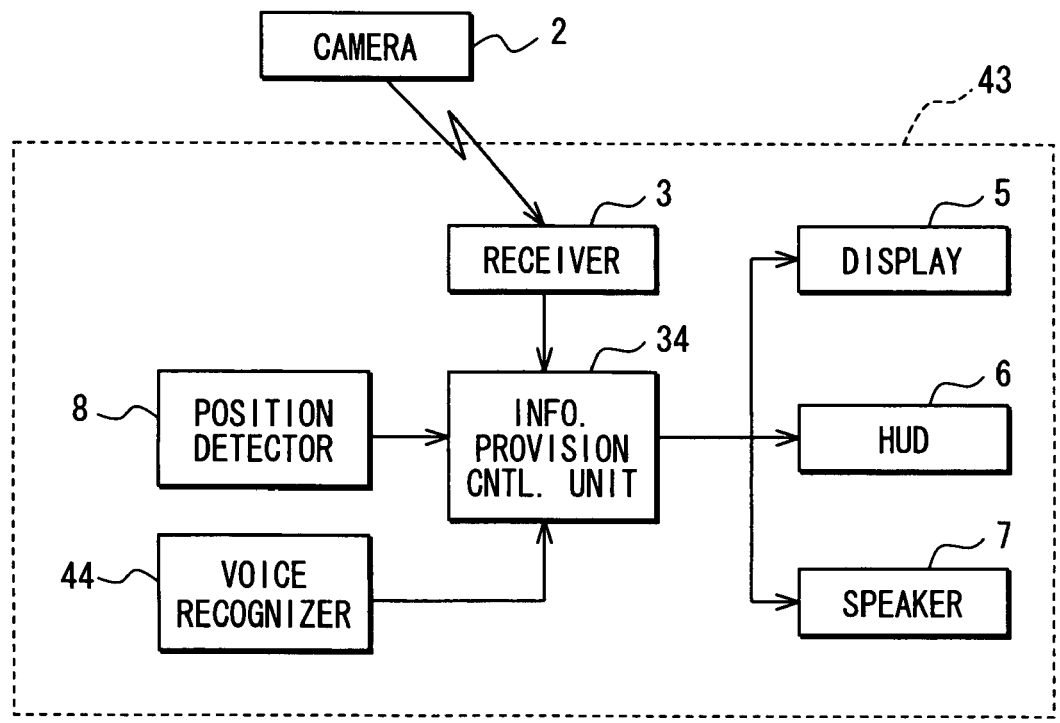
FIG. 18 shows a block diagram of a drive assistance system in a sixth embodiment.

FIG. 18 shows the drive assistance apparatus 43 in the sixth embodiment that includes a voice recognizer 44. The driver outputs a voice of "Recognized" or the like when he/she has looked at the field information on the liquid crystal display unit 5. The voice recognizer 44 recognizes the driver's voice and outputs a recognition results to the information provision control unit 34. Then, the information provision control unit 4 determines affirmatively in step S11 in the process in FIG. 14 (step S11:YES).

The recognition condition of the field information provided for the driver is detected either by the switch 42 or the voice recognizer 44 in the fifth and sixth embodiment, thereby enabling a secure detection of the recognition of the field information for assisting the driver's operation by the information provision control unit 34.

Although the present invention has been fully described in connection with the preferred embodiment thereof with reference to the accompanying drawings, it is to be noted that various changes and modifications will become apparent to those skilled in the art.

For example, the field information may be derived from a camera that is disposed on other vehicles.

Further, the field information may not be image information from the camera or the like. That is, the field information may be a computer animation image based on an image from the camera or the like. The animation image may be generated from a camera captured image by simplifying/emphasizing the image. The image may include a traffic signal, a traffic jam condition and the like.

Furthermore, the areas A, B may be arbitrarily defined for suitably providing the information according the situation.

Furthermore, the situation of the traffic may be different from the one described in the illustrations in FIGS. 4, 10, 11.

Furthermore, the supplemental information may be provided only by one of the HUD 6 and the speaker 7.

Furthermore, the number of the liquid crystal display units 22 in the second embodiment may be at least one unit. In addition, the WSD 25 may be omitted when two or more pieces of the liquid crystal display unit 22 are provided.

Furthermore, the driver's recognition of the liquid crystal display unit 5 may be determined by the look direction detector 33, and the information provision control unit 34 may have a detection result output from the look direction detector 33.

Furthermore, the liquid crystal display unit and/or the HUD may be replaced with an electro-luminescence (EL) display panel or the like.

Furthermore, the image information and/or other information may be transmitted not only from the camera on the roadside but also from the other vehicle or the like.

Furthermore, the position detector 8 may use position information provided by a radio beacon or the like that is disposed on the roadside. In addition, the position detector 8 may be omitted when the image information from the camera on the roadside includes the position information.

Furthermore, the driver's recognition of the information for assisting the driver's operation may be detected in the following manner.

(1) Change of driver's position for looking into the display unit may be detected based on a change of pressure that is detected by a pressure sensor in a driver's seat.

(2) Driver's brain waves may be detected by a brain wave sensor or the like, and the recognition condition may be determined based on the brain wave condition.

(3) Operation of an accelerator, a brake, and/or a steering wheel may be detected and used for determining the recognition condition.

Furthermore, the camera for capturing the image information may be replaced with a laser radar, a radio wave radar, an ultrasonic sensor, or other sensors. In addition, the drive assistance information may utilized the information derived from the radar or the sensor to map the obstacle and/or other possibly-hazardous vehicle on a navigation map or the like for supporting the driver's operation.

Such changes and modifications are to be understood as being within the scope of the present invention as defined by the appended claims.

What is claimed is:

1. A drive assistance system for assisting an operation of a driver comprising:
    an information transmission unit for transmitting field information representative of an outer field of the vehicle, wherein the information transmission unit is disposed on an outside of the vehicle, and wherein the outer field includes a field that is potentially invisible from the driver in an outside of the vehicle;
    a set of information provision units for providing the field information for the driver; and
    a control unit for controlling the set of information provision units, wherein the control unit makes one of the information provision units provide the field information derived from the information transmission unit for the driver for assisting the operation of the driver, and wherein the control unit makes one other information provision unit provide supplemental information that identifies the information provision unit being controlled for providing the field information derived from the information transmission unit,
    wherein the information transmission unit, the set of information provision units and the control unit are organized as a drive assistance apparatus.

2. The drive assistance system as in claim 1,
    wherein the field information is provided by a liquid crystal display device, and
    the supplemental information is provided by one of a headup display device and a sound generation device.

3. The drive assistance system as in claim 2,
    wherein a number of the liquid crystal display devices is at least two.

4. The drive assistance system as in claim 1 further comprising:
    a visual recognition detector for detecting a driver's visual recognition condition of the field information provided by the information provision unit,
    wherein the control unit terminates provision of the field information by the information provision unit when the visual recognition detector detects that that field information is visually recognized by the driver.

5. The drive assistance system as in claim 4,
    wherein the visual recognition detector includes an imaging unit for imaging an area that includes a driver's pupil and a look direction detection unit for detecting a direction of a driver's look, and
    the driver's visual recognition condition of the field information is determined based on the direction of the driver's look detected by the look direction detection unit.

6. The drive assistance system as in claim 5,
wherein, when the vehicle has a steering wheel on a right side of the vehicle and the information provision unit is disposed at a center of an instrument panel in the vehicle, the visual recognition detector detects that the driver has recognized the information provision unit on a condition that the direction of the driver's look is substantially within an angle range between 20 degrees and 50 degrees left from a straight front look direction of the driver and within an angle range between 20 degrees and 50 degrees downward from the straight front look direction of the driver.

7. The drive assistance system as in claim 5,
wherein, when the vehicle has a steering wheel on a left side of the vehicle and the information provision unit is disposed at a center of an instrument panel in the vehicle, the visual recognition detector detects that the driver has recognized the information provision unit on a condition that the direction of the driver's look is substantially within an angle range between 20 degrees and 50 degrees right from a straight front look direction and substantially within an angle range between 20 degrees and 50 degrees downward from the straight front look direction.

8. The drive assistance system as in claim 4,
wherein the visual recognition detector includes a switch that is operable by the driver.

9. The drive assistance system as in claim 4,
wherein the visual recognition detector includes a voice recognition unit that recognizes a voice of the driver.

10. The drive assistance system as in claim 4,
wherein, when the visual recognition detector has determined that the driver has been watching one of the field information provision units for a predetermined time, the control unit either controls any one of the information provision units to provide a warning message for the driver or terminates provision of the field information by the information provision unit.

11. The drive assistance system as in claim 10 further comprising:
a position detector for detecting a position of the vehicle,
wherein the control unit either controls any one of the information provision units to provide the warning message for the driver or terminates provision of the field information by the information provision unit when the position of the vehicle detected by the position detector is included in a predetermined area where the field information provided for the driver is assumed to be utilized in an effective manner.

12. The drive assistance system as in claim 11,
wherein the predetermined area is a proximity of an intersection where the vehicle is to make a right turn, and
the predetermined area is defined as an area that substantially includes an inside of the intersection and a road segment of 30 meters or shorter before the intersection.

13. The drive assistance system as in claim 11,
wherein the predetermined area is a proximity of an intersection that has a blind corner in a view of the driver in the vehicle, and
the predetermined area is defined as an area that substantially includes an inside of the intersection and a road segment of 50 meters or shorter before the intersection.

14. The drive assistance system as in claim 11,
wherein the predetermined area is a proximity of a merge section where two or more roads merges, and
the predetermined area is defined as an area that substantially includes an inside of the merge section and a road segment of 100 meters or shorter before the merge section.

15. The drive assistance system as in claim 11,
wherein the predetermined area is a proximity of an intersection where the vehicle is to make a left turn, and
the predetermined area is defined as an area that substantially includes an inside of the intersection and a road segment of 30 meters or shorter before the intersection.

16. The drive assistance system as in claim 10,
wherein provision of the warning message is executed as a visual display on one of the information provision units.

17. The drive assistance system as in claim 10,
wherein provision of the warning message is executed as a voice sound from one of the information provision units.

18. The drive assistance system as in claim 1,
wherein the drive assistance apparatus is used for supporting the driver.

* * * * *